United States Patent [19]

Schulze

[11] Patent Number: 5,419,510

[45] Date of Patent: May 30, 1995

[54] FILM RETENTION CORE FOR FILM HOLDERS

[75] Inventor: Michael D. Schulze, Farmington Hills, Mich.

[73] Assignee: Great Lakes Technologies Corporation, Kalamazoo, Mich.

[21] Appl. No.: 103,406

[22] Filed: Aug. 6, 1993

[51] Int. Cl.⁶ ............................................. B65H 75/28
[52] U.S. Cl. ..................................................... 242/587.3
[58] Field of Search ............... 242/348.1, 532.6, 587.1, 242/587.2, 587.3

[56] References Cited

U.S. PATENT DOCUMENTS

| | | |
|---|---|---|
| 2,189,547 | 2/1940 | Fischer . |
| 2,571,796 | 10/1951 | Ulmschneider et al. . |
| 2,951,656 | 9/1960 | Wellman . |
| 2,954,941 | 10/1960 | Hultgren . |
| 3,184,178 | 5/1965 | Bodge . |
| 3,357,653 | 12/1967 | Otsuka . |
| 3,361,380 | 1/1968 | Mizutani . |
| 3,648,944 | 3/1972 | Fujiwara et al. . |
| 3,675,869 | 7/1972 | Grant . |
| 3,715,088 | 2/1973 | Rissberger . |
| 3,743,204 | 7/1973 | Hertel . |
| 3,982,709 | 9/1976 | Hertel ............................... 242/587.2 |
| 4,540,134 | 9/1985 | Schankler . |
| 4,629,140 | 12/1986 | LaCasse . |
| 4,798,352 | 1/1989 | Naso et al. . |
| 4,809,923 | 3/1989 | Adriaesen et al. . |
| 4,863,111 | 9/1989 | Nase et al. . |

FOREIGN PATENT DOCUMENTS 5540157  3/1980  Japan .

Primary Examiner—John M. Jillions
Attorney, Agent, or Firm—Howard & Howard

[57] ABSTRACT

A film holder having an integral core and core for film holders, wherein the core is composed generally of a collar having an inside wall of a predetermined shape and a hub concentric with respect to the collar. The hub has an outside surface which is in part symmetrically shaped with respect to the inside surface of the collar so as to provide a film channel, and in part separated from the inside surface of the collar to provide open areas for facilitating film loading and film posting. The channel provides very easy loading of the film and yet further provides an extensive length along which the film is caused to be curvaceously bent in an over-all arcuate shape which results in sufficient friction so as to retain the film on the core even when longitudinal forces are applied to it, and yet further not subject the film to an untoward strain at any location.

11 Claims, 2 Drawing Sheets

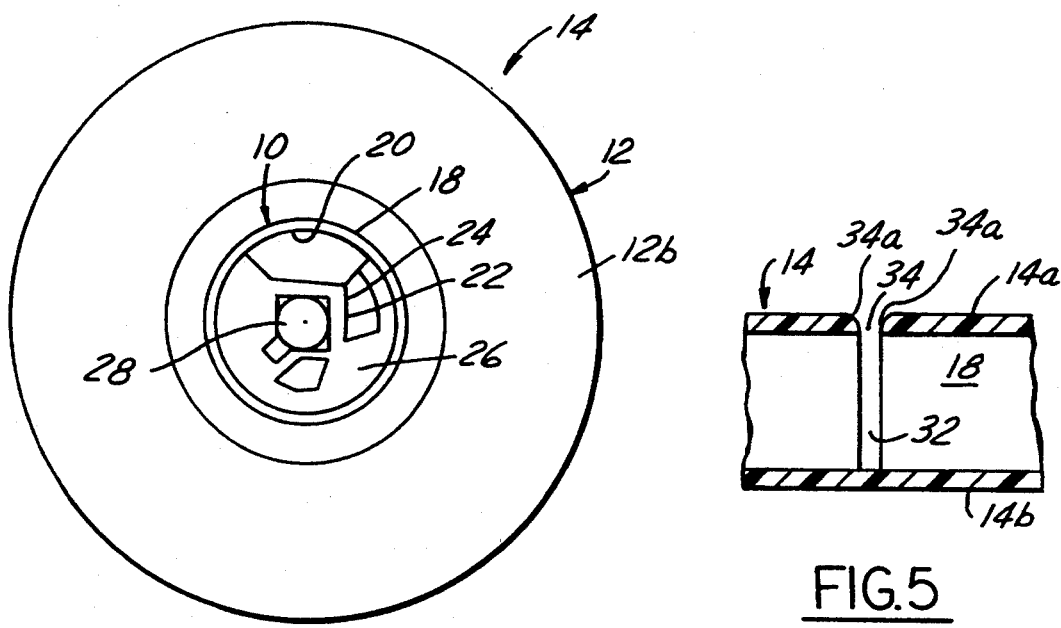
FIG.4
FIG.5
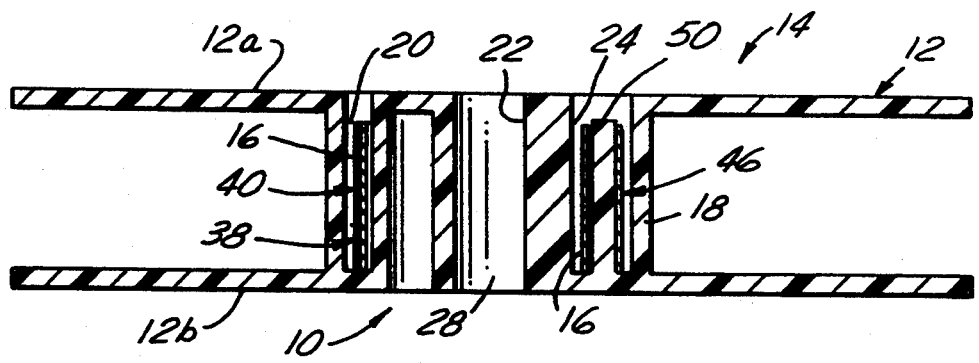
FIG.6

FILM RETENTION CORE FOR FILM HOLDERS

BACKGROUND OF THE INVENTION

1. Field of the invention

The present invention relates to holders for wound film mate is such as microfilm, and more particularly to film retention cores utilized therein. Still more particularly, the present invention relates to a film retention core structured for providing both easy loading and tenacious film retention.

2. Description of the Prior Art

It is known to provide structures of holding wound film materials. These structures, known as film holders, are composed of a reel having two separated discs and a central core which connects with each of the discs and affords a structure for holding an initial section of the film material from unraveling from the reel holder.

One example of a wound film material holding structure is represented by a product currently on the market which is depicted in FIG. 1 and described in U.S. Pat. No. 4,798,352 to Naso et al, dated Jan. 17, 1989. In this film holder 200, there is provided a reel consisting of a pair of separated top and bottom discs 202, 204 and a core 206 connecting the discs. The core 206 has an outer collar 208 and an inner collar 210 between which is formed a thread-space 212. The thread-space communicates with a slot 214 provided in the top disc 202 and the outer collar 208. A plurality of convex surfaces 216 are connected with the inner collar 210. There is also provided a rib 218 connected with the outer collar 208 and a post 220 connected with a floor 222 of the core 206. In operation, the film 224 is looped and then threaded labyrinthly around the convex surfaces, rib and the post, Another example of a wound film material holding structure is represented by another product currently on the market which is depicted in FIG. 2 and described in U.S. Pat. No. 4,540,134 to Schankler, dated Sep. 10, 1985. In this film holder 300, there is provided a reel consisting of a pair of separated top and bottom discs 302, 304 and a core 306 connecting the discs. The core 306 has a cylinder 308 and a collar 310 between which is formed a thread-space 312. The thread-space communicates with a slot 314 provided in the top disc 302 and the cylinder 308. The collar is rectangular with a plurality of corners 316 whereat there is an opposed rib 318. There is further provided a channelled wall member 320 connected with the collar with an opposing rib 318. A post 322 is connected with a floor 324 of the core 306. A rib 326 is connected with the collar 310 adjacent the post 322. In operation, the film 328 is looped and then threaded labyrinthly between the corners and ribs, the channelled wall member and its adjacent rib, and the post.

Both of these structures suffer from widely separated interacting adjacent film abutments which pose difficult threading for a user. Further, since the interacting adjacent film abutments are mutually widely spaced, there is the potential for generation of untoward strain in the film at these abutments which can lead to failure of the film.

Accordingly, what is needed is a core for film reels which affords very easy loading of the film, long life for the film, and excellent retention of the film with respect to the core.

SUMMARY OF THE INVENTION

The present invention is a core for film reels which affords very easy loading of the film, long life for the film, and excellent retention of the film with respect to the core.

The core according to the present invention is composed generally of a collar having an inside wail of a predetermined shape and a hub concentric with respect to the collar, wherein the hub has an outside surface which is in part symmetrically shaped with respect to the inside surface of the collar so as to provide a film channel, and in part separated from the inside surface of the collar to provide open areas which facilitate film loading and film posting.

The channel provides very easy loading of the film and yet further provides an extensive length along which the film is caused to be curvaceously bent in an over-all arcuate shape which results in sufficient friction so as to retain the film on the core even when longitudinal forces are applied to it, and yet further not subject the film to an untoward strain at any location.

It is an object of the present invention to provide a core for a film reel which is very easy loading and yet provides sufficient friction with respect to the film so as to retain the film on the core even when large longitudinal forces are acting upon it, and yet further has no location where untoward strain locations are generated within the film.

It is still an additional object of the present invention to provide a core for a film reel which provides for the film being curvaceously bent in an over-all arcuate shape via a channel that is very easily loaded and which provides a high degree of frictional retention of the film with respect to the core.

These, and additional objects, advantages, features and benefits of the present invention will become apparent from the following specification.

BRIEF DESCRIPTION OF THE DRAWINGS

FIG. 4 is a bottom plan view of the core according to the present invention, shown in operation with the reel depicted in FIG. 3.

FIG. 5 is a sectional detail side view of the core according to the present invention, showing a slot for entry of film.

FIG. 6 is a sectional side view of the core according to the present invention, shown in operation with the reel depicted in FIG. 3.

DETAILED DESCRIPTION OF THE PREFERRED EMBODIMENT

Figure 1:
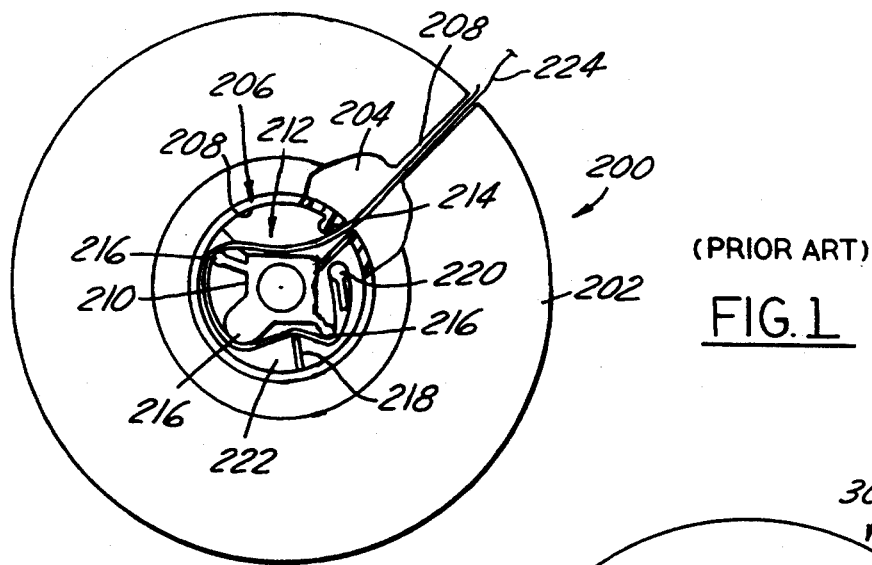
FIG. 1 is a partly sectional top plan view of a first prior art film reel and core, shown in operation with a loaded film.
Figure 2:
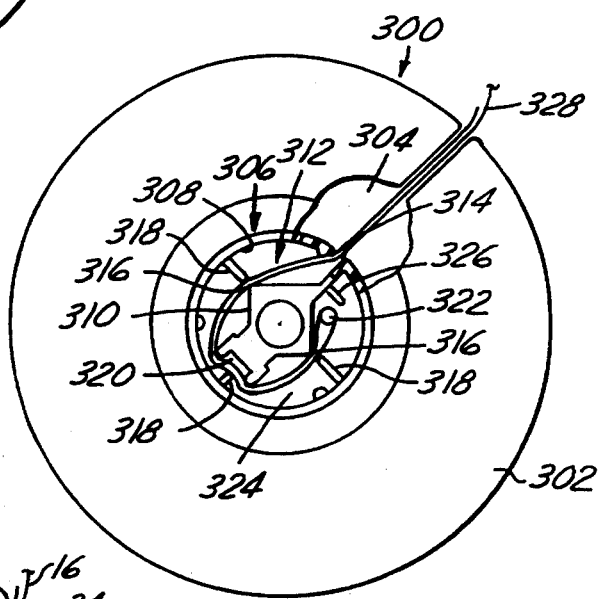
FIG. 2 is a partly sectional top plan view of a second prior art film reel and core, shown in operation with a loaded film.
Figure 3:
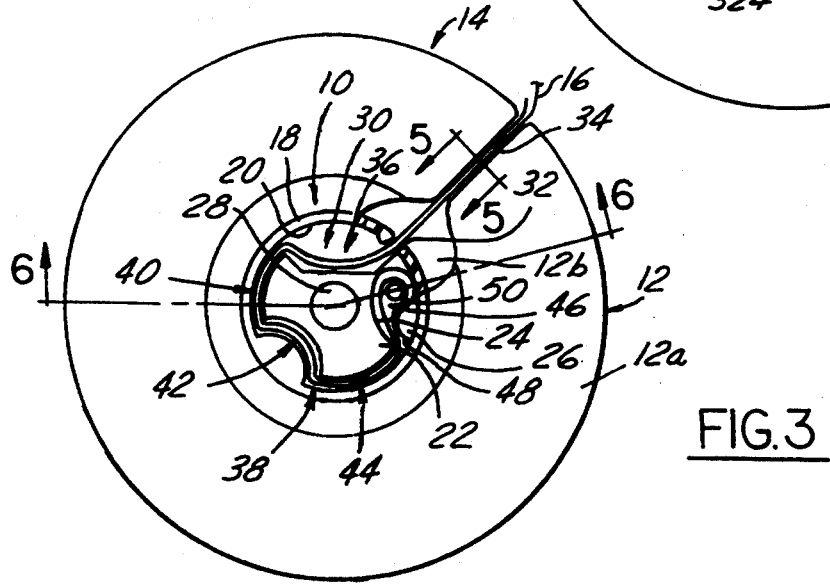
FIG. 3 is a partly sectional top plan view of the core according to the present invention, shown in operation with a reel and further shown with respect to a loaded film.

Referring now to the Drawing, FIG. 3 shows the core 10 according to the present invention being utilized in connection with a reel 12 composed of a pair of separated top and bottom discs 12a, 12b. In this regard, the reel 12 is integrally formed with the core 10 as a single piece, plastic inaction molded film holder 14. The core 10 is structured to provide simple and easy loading of a film 16 there and to provide a high retention expectancy for the film in the face of large longitudinal forces applied along the length of the film.

The structure and function of the core 10, as well as the film holder 14, will be detailed with greater specificity by reference being additionally had to remaining FIGS. 4 through 6.

The core 10 has a collar 18 having an inside wall 20. The core further has a hub 22 having an outside wall 24. The hub 22 is located concentrically with respect to the collar 18 and connected thereto by a floor 26. The hub 22 is provided with a keyed axial aperture 28 for connecting the film holder 14 to a drive spindle (not shown) in a conventional manner known in the art.

A thread-space 30 is provided between the inside surface 20 of the collar 18 and the outside surface 24 of the hub 22. The thread-space 30 communicates with a core slot 32 in the collar 18. The core slot 32 in the collar 18 communicates, in turn, with a radially oriented reel slot 34 provided in the top disc 12a.

The thread-space 30 is partly defined by a first open area 36 adjacent the core slot 32 in the collar 18 for facilitating placement of the film 16 (in a looped configuration) through the core slot. The thread-space 30 is further defined by a channel 38 which communicates with the first open area 36. The channel 38 is characterized by the proximate juxtaposition of the inside wall 20 with the outside wall 24. The channel 38 is defined by three successively communicating segments: a first convexly arcuate segment 40 adjacent the open area 36, followed by a concavely arcuate segment 42, finally followed by a second convexly arcuate segment 44. The thread-space 30 is still further defined by a second open area 46 which communicates with the second convexly arcuate segment 44 of the channel 38. The second open area 46 is provided with a convexly curved land 48 located on the inside surface 20 substantially adjacent the channel 38, and is further provided with a post 50 connected with the floor 26.

The reel 12 is conventionally configured, as indicated, in the form of the top disc 12a and the bottom disc 12b. In this regard, the film holder 14 is constructed with a top end of the core 10 being integrally connected with the top disc 12a, while an opposite bottom end of the core (which carries the floor 26) is connected with the bottom disc 12b. The reel slot 34 in the top disc 12a is preferably provided with a beveling 34a on the side thereof facing away from the bottom disc 12b in order to facilitate placement of the film 16 threadably through the reel slot.

In operation, a user makes a loop of the film 16, then places the loop through the core and reel slots 34, 32 and thereupon easily and simply places the looped film threadably into the channel 38, threads the looped film around the convexly curved land 48 and loopably about the post 50. Preferably, the loop of film provides a generous amount of overlap of film which includes a portion thereof that is located external to the core 10 for being wrapped about the core. Now the film 16 is wound upon the core to fill the space between the top and bottom discs that compose the reel 12.

It is to be understood that the channel 38 is a significant improvement in the art, in that it provides a continuous threading abutment for the film which makes loading film onto the core very easy and simple. Further, the gentle curves of the path of the film through the core assuages the development of located strain in the film even when large longitudinal force loads are placed thereupon during operation. Still further, the convexly and concavely curved segments of the channel, the convexly curved land and the post all combine to provide a superior and very effective frictional interaction between the core and the adjacent film surfaces of the looped film so as to provide unexcelled retention of the film with respect to the core in the face of large longitudinal forces being applied thereto.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A core for a film holder, said core comprising:
   a collar having an inside wall, said collar being provided with a core slot;
   a hub having an outside wall;
   a floor connecting said collar with said hub;
   a thread-space formed between said outside wall and said inside wall, said thread-space comprising:
      a first open area communicating with said core slot;
      a channel communicating with said first open area, said channel comprising:
         a first convexly arcuate segment communicating with said first open area;
         a concavely arcuate segment communicating with said first convexly arcuate segment; and
         a second convexly arcuate segment communicating with said concavely arcuate segment; and
      a second open area communicating with said channel at said second convexly arcuate segment; and
   a post connected with said floor, said post being located at said second open area.

2. The core of claim 1, further comprising a convexly shaped land located at the second open area between said post and said channel.

3. The core of claim 2, further comprising connection means for driveably connecting said core to a spindle drive.

4. A film holder comprising:
   a reel comprising:
      a top disc, said top disc being provided with a radially oriented reel slot; and
      a bottom disc; and
   a core having a top end and a bottom end, said top end of said core being connected to said top disc, said bottom end of said core being connected to said bottom disc; said core comprising:
      a collar having an inside wall, said collar being provided with a core slot communicating with said reel slot;
      a hub having an outside wall;
      a floor connecting said collar with said hub;
      a thread-space formed between said outside wall and said inside wall, said thread-space comprising:
         a first open area communicating with said core slot;
         a channel communicating with said first open area, said channel comprising:
            a first convexly arcuate segment communicating with said first open area;
            a concavely arcuate segment communicating with said first convexly arcuate segment; and a second convexly arcuate segment communicating with said concavely arcuate segment; and a second open area communication with said channel at said second convexly arcuate segment; and a post connected with said floor, said post being located at said second open area.

5. The film holder of claim 4, wherein said reel is integrally connected with said core.

6. The film holder of claim 4, further comprising beveling on said reel slot on a side of said top disc facing away from said bottom disc.

7. The core of claim 4, further comprising connection means for driveably connecting said core to a spindle drive.

8. The film holder of claim 4, further comprising a convexly shaped land located at the second open area between said post and said channel.

9. The film holder of claim 8, further comprising beveling on said reel slot on a side of said top disc facing away from said bottom disc.

10. The core of claim 9, further comprising connection means for driveably connecting said core to a spindle drive.

11. The film holder of claim 10, wherein said reel is integrally connected with said core.

* * * * *